US012802492B2

(12) United States Patent
Kang

(10) Patent No.: US 12,802,492 B2
(45) Date of Patent: Nov. 17, 2026

(54) METHOD AND APPARATUS FOR MEASURING EXERCISE AMOUNT BY USING ARTIFICIAL INTELLIGENCE AND MACHINE LEARNING

(71) Applicant: Alyce Healthcare Inc., Ulsan (KR)

(72) Inventor: Da kyum Kang, Ulsan (KR)

(73) Assignee: Alyce Healthcare Inc., Ulsan (KR)

( * ) Notice: Subject to any disclaimer, the term of this patent is extended or adjusted under 35 U.S.C. 154(b) by 85 days.

(21) Appl. No.: 18/430,767

(22) Filed: Feb. 2, 2024

(65) Prior Publication Data

US 2025/0209855 A1 Jun. 26, 2025

(30) Foreign Application Priority Data

Dec. 21, 2023 (KR) ........................ 10-2023-0187799

(51) Int. Cl.
*G06V 40/20* (2022.01)
*G06V 20/40* (2022.01)

(52) U.S. Cl.
CPC .............. *G06V 40/23* (2022.01); *G06V 20/40* (2022.01)

(58) Field of Classification Search
CPC ............................... G06V 20/40; G06V 40/23
See application file for complete search history.

(56) References Cited

U.S. PATENT DOCUMENTS

2009/0298650 A1 * 12/2009 Kutliroff ............... H04W 68/00 482/8

FOREIGN PATENT DOCUMENTS

| | | | | |
|---|---|---|---|---|
| KR | 10-2014-0052782 A | 5/2014 | | |
| KR | 10-2015-0047171 A | 5/2015 | | |
| KR | 10-1986327 B1 | 6/2019 | | |
| KR | 10-2020-0072931 A | 6/2020 | | |
| KR | 10-2021-0124792 A | 10/2021 | | |
| KR | 20220096279 A | 7/2022 | | |
| KR | 10-2023-0087352 A | 6/2023 | | |
| WO | WO-2022226365 A1 * | 10/2022 | ............. | G06T 7/251 |

OTHER PUBLICATIONS

Request for the Submission of an Opinion of KIPO for 10-2023-0187799, issued on Aug. 10, 2026.

* cited by examiner

*Primary Examiner* — Ruiping Li
(74) *Attorney, Agent, or Firm* — ZION IP; Byungwoong Park

(57) ABSTRACT

The present disclosure provides a method for providing rewards based on exercise amount measurement performed by a reward providing apparatus. The method according to an embodiment may comprise: receiving a video image of a user's body inputted through an image input part of a user terminal; recognizing a motion corresponding to a pre-set exercise in the video image of the user's body using a pre-learned artificial intelligence model for motion recognition; measuring an exercise amount based on the recognized motion; providing a customized content to the user through a first area of an image output part based on the measured exercise amount and at least one piece of the user's information; and providing a reward to the user based on a watch result of the provided content.

10 Claims, 9 Drawing Sheets

METHOD AND APPARATUS FOR MEASURING EXERCISE AMOUNT BY USING ARTIFICIAL INTELLIGENCE AND MACHINE LEARNING

CROSS REFERENCE TO RELATED APPLICATION

This application claims priority to Korea Patent Application No. 10-2023-0187799 filed on Dec. 21, 2023, which is hereby incorporated by reference in its entirety.

BACKGROUND

1. Field of Technology

The present disclosure relates to a method and an apparatus for providing rewards based on exercise amount measurement. More specifically, it relates to a method for identifying an amount of exercise performance of a user through motion recognition based on artificial intelligence and providing a corresponding reward and the relevant apparatus.

2. Related Technology

Technologies for real time analysis of a user's posture and motion through motion recognition and their visualization based on artificial intelligence have been disclosed. Services in various fields using such technologies have been developed. In particular, service products for home training, utilizing only simple equipment such as a camera, have been released during a period when untact exercises were preferred.

However, conventional services for home training have limitations. They either require additional exercise equipment to enhance exercise effects, or there is a limit to the precision in measuring a user's motion, which leads to a restrictions on the filming angle of a user's motion. In addition, since motivations for consistent exercises are insufficient in home training compared to offline training where a user does exercises with a coach or a group, a market in home training struggles to develop.

Accordingly, there is a demand for an online home training service that ensures the precision of artificial intelligence motion recognition for exercises suitable for users to perform independently.

The discussions in this section are only to provide background information and do not constitute an admission of prior art.

DOCUMENTS OF PRIOR ARTS

Patent Document

Reference 1: Korean Patent Laid-open Gazette No. 10-2022-0096279

SUMMARY

In order to solve the above described problems, the present disclosure is to provide a method and apparatus to increase motivation for exercises by providing a reward based on the measurement of a user's exercise posture and/or the number of exercises.

Specifically, an aspect of the present disclosure is to provide a method and apparatus to analyze and output in real time a video image of a user performing an exercise by using artificial intelligence and to provide a reward for watching an advertisement by presenting an advertisement in an area of the video image outputted during or after completing the exercise.

Another aspect of the present disclosure is to provide a method and apparatus to enhance participation in a home training exercise by introducing competition within an exercise group of an online service for home training.

Specifically, another aspect of the present disclosure is to provide a method and apparatus to rank the levels of exercise achievement of a plurality of users.

Still another aspect of the present disclosure is to provide a method and apparatus to determine ranks of rewards by measuring the levels of exercise achievement of repetitive users.

Specifically, the present disclosure is to provide a method and apparatus to correct a user's exercise posture and sightline direction by adjusting at least one of the position and the size of an inventory related to reward provision in order to assess the user's exercise posture and to guide the user through a correct posture.

Specifically, the present disclosure is to provide a method and apparatus to determine at least one of the size, type, and duration of an inventory depending on a user's final number of exercise motions or achievement level, to provide a content according to a determined property of the inventory during a break of an exercise, and to determine a corresponding reward.

Technological aspects of the present disclosure are not limited to the aforementioned aspects and other technological aspects, which are not described above, would be clearly understood by a person with ordinary skill in the art based on the following description.

To achieve the above aspects, an embodiment of the present disclosure provides a method for providing rewards, based on exercise amount measurement performed by a reward providing apparatus, comprising: receiving a video image of a user's body inputted through an image input part of a user terminal; recognizing a motion corresponding to a pre-set exercise in the video image of the user's body by using a pre-learned artificial intelligence model for motion recognition; measuring an exercise amount based on the recognized motion; providing a customized content to the user through a first area of an image output part based on the measured exercise amount and at least one piece of the user's information; and providing a reward to the user based on a watch result of the provided content.

In an embodiment, recognizing a motion corresponding to a pre-set exercise may comprise: extracting feature points corresponding to the user's body in the video image by using the model for motion recognition; determining whether the feature points are within a predetermined area on the screen of the image output part; and recognizing movements of the feature points sensed within a predetermined pattern range as a motion corresponding to the exercise when the feature points are determined to be within the predetermined area.

In an embodiment, recognizing a motion corresponding to a pre-set exercise may comprise: sensing a movement of at least one of the feature points in a depth direction of the screen of the image output part; and recognizing a motion corresponding to the exercise by sensing movements of a plurality of feature points within the predetermined pattern range when the at least one of the feature points moves, and measuring the amount of the exercise may comprise counting the number of exercise motions when sensing that the plurality of feature points move within the predetermined pattern range.

In an embodiment, determining whether the feature points are within a predetermined area may comprise generating movement guide information for the movements of the feature points regarding the exercise based on at least one among distances and angles between extracted feature points, and recognizing a motion corresponding to a pre-set exercise may comprise determining the degree of match between the movements of the feature points sensed within the predetermined pattern range and the movement guide information.

In an embodiment, receiving a video image of a user's body may comprise outputting the received video image of the user's body through the image output part; recognizing a motion corresponding to a pre-set exercise may comprise extracting feature points corresponding to the user's body in the video image by using the model for motion recognition and marking the extracted feature points to overlap the user's body of the outputted video image; providing a customized content to the user through a first area of an image output part may comprise providing the customized content to the user through the first area of the image output part with the extracted feature points marked to overlap the user's body of the video image.

In an embodiment, providing a customized content to the user through a first area of an image output part may comprise providing the content through a second area in a position different from that of the first area when the degree of match falls short of a predetermined critical match degree value.

In an embodiment, providing the content through the second area of the image output part may comprise assessing whether the degree of match, between movements of the feature points and movements in the movement guide information, exceeds the predetermined critical match degree value and determining a final position for providing the content based on the result of the assessment.

In an embodiment, providing a customized content to the user may comprise providing a first content based on the measured exercise amount and at least one piece of the user's information and providing a second content different from the first content through the first area in a case when the measured exercise amount exceeds a predetermined number.

In an embodiment, providing a second content through the first area may comprise providing the second content through a second area with a larger size than the first area.

In an embodiment, providing a customized content to the user may comprise determining the size of an area for outputting contents based on a measured exercise amount and at least one piece of the user's information, generating an inventory through the image output part based on the determined size, determining at least one of the kind and duration of a content to be outputted in the inventory based on the measured exercise amount and at least one piece of the user's information, and outputting the content, of which the at least one of the kind and duration is determined, through the generated inventory.

In an embodiment, determining the size of an area for outputting contents based on a measured exercise amount and at least one piece of the user's information may comprise comparing a measured exercise amount of a competitor pre-set through the user terminal and the measured exercise amount of the user and determining the size of a content to be outputted based on the comparison result.

To achieve the above aspects, another embodiment of the present disclosure provides a reward providing apparatus comprising: at least one processor; a network interface to receive a video image of a user's body filmed by a user terminal; a memory to load a computer program executed by the processor; and a storage in which the computer program is stored.

In an embodiment, the computer program may comprise an operation of recognizing a motion corresponding to a pre-set exercise in the video image of the user's body by using a pre-learned artificial intelligence model for motion recognition; an operation of measuring an exercise amount based on the recognized motion; an operation of providing a customized content to the user through a first area of an image output part based on the measured exercise amount and at least one piece of the user's information; and an operation of providing a reward to the user based on a watch result of the provided content.

An embodiment of the present disclosure has an effect of drawing consistent exercise achievement of the user by providing rewards for the user's participation in the exercise. In addition, it has an advantage of inducing competition among users and maximizing an effect of exercise by making a plurality of users participate in the exercise and ranking achievement levels of the users.

An embodiment of the present disclosure has an advantage of filming a user's motion of an exercise from the front, outputting the motion to the user performing the motion of the exercise in real time, and providing exercise state information at the same time by using a technology of motion recognition based on an artificial intelligence. This leads to an effect of providing the user with an environment in which the user can concentrate on the exercise.

Another embodiment of the present disclosure has an effect of correcting a sightline direction and a posture of the user to guide the user through a desirable exercise posture by moving the exercise state information on a screen on which exercise motions are displayed.

Effects of the present disclosure are not limited to the aforementioned effects and other effects, which are not described above, would be clearly understood by a person with ordinary skill in the art based on the following description.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF EMBODIMENTS

Figure 1:
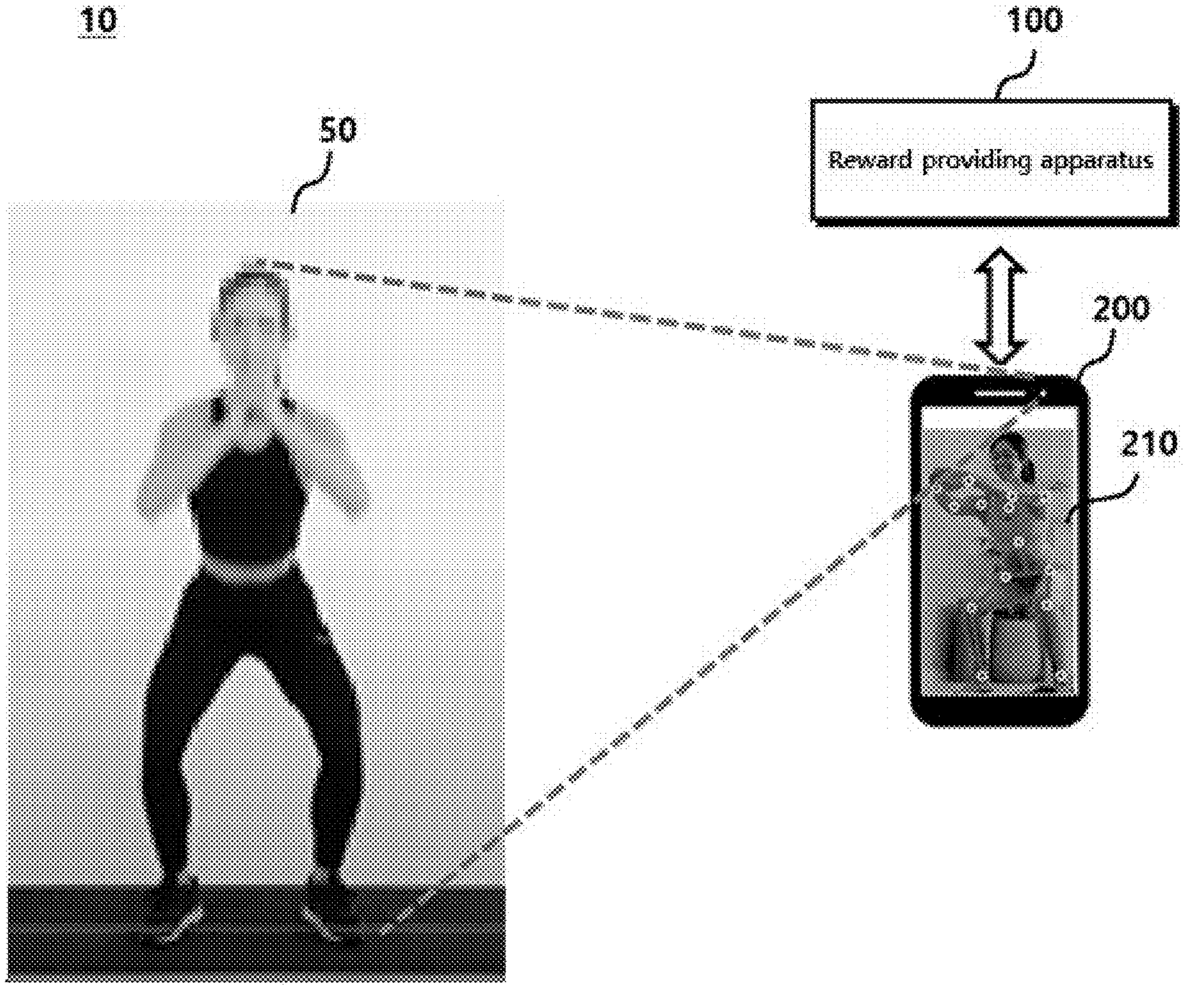
FIG. 1 is an example diagram of a system for providing rewards based on exercise amount measurement according to an embodiment of the present disclosure.

Hereinafter, preferred embodiments of the present disclosure will be described in detail in reference to accompanying drawings. Advantages and characteristics of the present disclosure and a method to achieve them will be clear by referring to embodiments described in detail below together with accompanying drawings. However, the present disclosure is not limited to the below disclosed embodiments, but may be implemented in various types different from each other. The embodiments are provided only for completing the present disclosure and for completely teaching the scope of the present disclosure to a person with ordinary knowledge in the art to which the present disclosure pertains. The present disclosure is defined only by the scope of the claims. With regard to the reference numerals of the components of the respective drawings, it should be noted that the same reference numerals are assigned to the same components.

If there is no other definition, all the terms used in this specification (including technological and scientific terms) have meanings that can be commonly understood by persons with ordinary skill in the art to which the present disclosure pertains. In addition, generally used terms defined in dictionaries shall not be ideally or excessively interpreted if they are not clearly and particularly defined such. The terms used in this specification are to explain the embodiments, but not to limit the present disclosure. In this specification, a term in a singular form may also mean a term in a plural form as long as there is no particular indication.

In this specification, a system, a method, and an apparatus for providing rewards based on exercise amount measurement may respectively be abbreviated as a reward providing system, a reward providing method, and a reward providing apparatus.

In this specification, terms such as 'module', 'unit', or 'part' may refer to a unit for software and/or hardware. For example, an operation determining part may represent a bundle of codes for performing a function of assessing a user's motion regarding a certain exercise motion in a user's video image.

A hardware module/unit/part may be a hardware resource present for each processor to perform an operation for a specific function. A module/unit/part may refer not only to a software module/unit/part or a hardware module/unit/part, but also to a unit where certain software and hardware are combined.

FIG. 1 is an example diagram of a system for providing rewards based on exercise amount measurement according to an embodiment of the present disclosure.

A reward providing system according to an embodiment of the present disclosure may provide a training service of performing a skeleton analysis of a user's motion in real time based on artificial intelligence, guiding a motion of the user according to a type of an exercise programmed or selected by the user, and analyzing and assessing the user's motion in real time.

In an embodiment, the reward providing system may provide a home training service including various types of exercises, such as weight trainings, CrossFit, yoga, Pilates, gymnastics, dances, meditations, or the like. An exercise according to an embodiment of the present disclosure may be, in particular, squats.

Referring to FIG. 1, a reward providing system 10 may comprise a reward providing apparatus 100 and a user terminal 200. The reward providing apparatus 100 and the user terminal 200 are computing devices performing mutual data communication.

For example, the reward providing apparatus 100 may be a server device to control the user terminal 200 for performing a method according to an embodiment of the present disclosure and the user terminal 200 may be a client device to store and execute an application for performing the method in an end user terminal. For example, the reward providing apparatus 100 may be a cloud server and the user terminal 200 may be a smart mobile apparatus, which is an edge device.

Although FIG. 1 shows a reward providing system 10 comprising a reward providing apparatus 100 and a user terminal 200, a reward providing apparatus 100 and a user terminal 200 may be integrated to form one device.

The reward providing apparatus 100 may control functions and operations of the user terminal 200 when executing reward providing software according to an embodiment of the present disclosure.

The user terminal 200 may film a video image of an exercise motion of a user 50 by an image input part and output the video image in real time through an image output part. For example, in order for the user 50 to verify the user's exercise motion through the image output part, the user 50 may face the image input part of the user terminal 200 and perform squats.

The user terminal 200 may output a video image of the user's body through a screen 210. Here, the reward providing system may extract feature points of the user's motion through real-time skeleton analysis of the user's motion using a pre-learned artificial intelligence model for motion recognition and output the extracted feature points to overlap the user's body in the video image, which was being displayed.

Although it is not shown, the user terminal 200 may output a video image of a tutor and the tutor's motion through the screen 210 in order to guide the user through a squat motion. The video image of the tutor or the tutor's motion may be a video image of a virtual character or an actual trainer teaching exercise.

In a case when the exercise is squats for example, the user may do squats in real time while the user watches the tutor's motions displayed in a predetermined area of the screen 210 and the squat motions of the user may be inputted through the image input part and displayed an area of the screen 210, which is different from or partially overlaps the aforementioned predetermined area.

Here, the reward providing apparatus 100 may conduct a skeleton analysis of the user's squat motion using a pre-learned artificial intelligence model for motion recognition and the analyzed result, combined with exercise state information and a content according to an embodiment of the present disclosure, may be displayed through the user terminal 200.

According to an embodiment of the present disclosure, the user terminal 200 outputs exercise state information and the reward providing apparatus 100 determines a reward in accordance with a target amount of exercise and/or a target amount of rewards inputted by the user.

Figure 2:
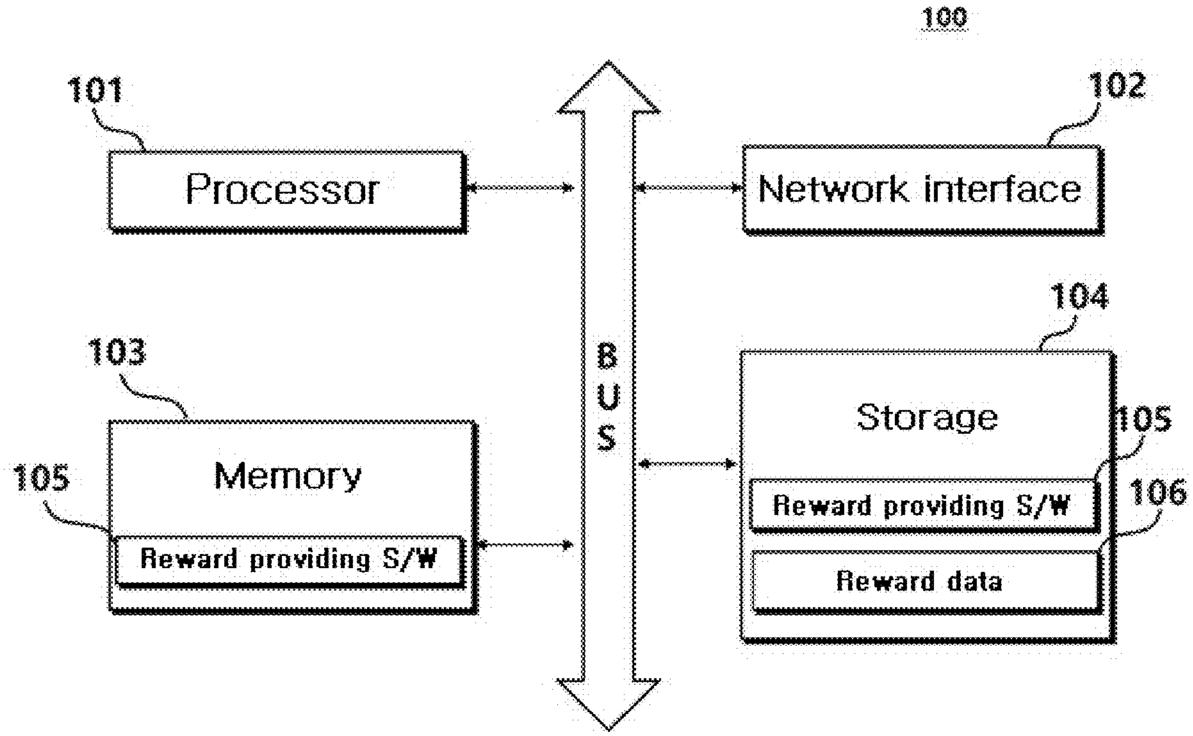
FIG. 2 is a block diagram of an apparatus for providing rewards based on exercise amount measurement according to another embodiment of the present disclosure.

FIG. 2 is a block diagram of an apparatus for providing rewards based on exercise amount measurement according to another embodiment of the present disclosure.

A reward providing apparatus 100 may comprise at least one processor 101, a network interface 102 to receive a video image of the user's body filmed by the user terminal, a memory 103 to load a computer program 105 executed by the processor 101, and a storage 104 in which the computer program 105 is stored.

In a case when the reward providing apparatus 100 is integrated with the user terminal 200 according to another embodiment of the present disclosure, the reward providing apparatus 100 may further comprise an image input part and an image output part.

The processor 101 generally controls operations of respective components of the reward providing apparatus 100. The processor 101 may comprise a central processing unit (CPU), a micro processor unit (MPU), a micro controller unit (MCU), an application processor (AP), or a random type of a processor, which is well known in the technical field of the present disclosure. The processor 101 may perform operations with respect to at least one application and/or program in order to perform a method according to embodiments of the present disclosure.

The network interface 102 supports wire or wireless internet communication of the reward providing apparatus 100. The network interface 102 may also support other various communication modes besides internet communication, which is a public communication network. In addition, the network interface 102 may provide connection with the user terminal 200. For this, the network interface 102 may comprise at least one of a communication module and a connection terminal, which are well known in the technical field of the present disclosure.

According to an embodiment of the present disclosure, the network interface 102 may form an interface between the reward providing apparatus and an artificial neural network, which is widely known in the technical field of the present disclosure.

According to an embodiment of the present disclosure, the reward providing device 100 may identify that a motion of the user is at least a part of a certain exercise motion using a pre-learned artificial intelligence model for motion recognition in the artificial neural network.

The memory 103 stores various data, commands and/or information. The memory 103 may load at least one program 105 from the storage 104 in order to implement embodiments of the present disclosure. The memory 103 of FIG. 2 may be a RAM.

The storage 104 may store at least one program 105 and reward data 106. FIG. 2 shows reward providing software 105 as an example of the at least one program 105.

In one embodiment, the reward data 106 may comprise cumulative reward data of the user and a plurality of other users.

The storage 104 may comprise a non-volatile memory, such as a read only memory (ROM), an erasable programmable ROM (EPROM), an electrically erasable programmable ROM (EEPROM), and a flash memory, a hard disk, a detachable disk, or a random type of a computer readable recording medium, which is well known in the technical field of the present disclosure.

Although FIG. 2 shows an example in which the storage 104 is a component of the reward providing apparatus 100, the present disclosure is not limited thereto, but, the storage 104 may be a component outside the reward providing apparatus 100, such as a cloud connected through a network.

According to an embodiment of the present disclosure, the processor 101 of the reward providing apparatus 100 executes each operation, whereby a reward providing method based on the reward providing software 105 may be implemented.

Figure 3:
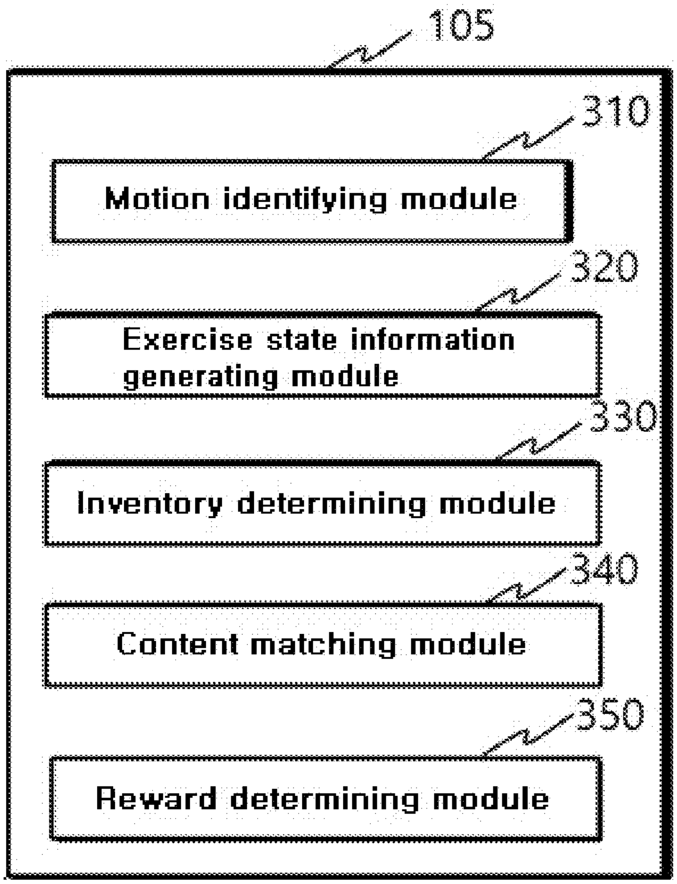
FIG. 3 is an example of software for providing rewards based on exercise amount measurement according another embodiment of the present disclosure.

FIG. 3 is an example of software for providing rewards based on exercise amount measurement according another embodiment of the present disclosure. Referring to FIG. 3, the reward providing apparatus 100 may execute the reward providing software 105.

The software 105 may comprise a plurality of modules, each of which is a functional unit. In FIG. 3, the software 105 may comprise a motion identifying module 310, an exercise state information generating module 320, an inventory determining module 330, a content matching module 340, and a reward determining module 350. Although the reward providing apparatus 100 operates the respective modules of the software 105 through operations of the respective modules by the processor 101, for the convenience of the description, it will hereinafter be represented that it is the respective modules that operate.

For example, the motion identifying module 310 may identify whether a user's motion is a motion of a pre-registered exercise. For this, the motion identifying module 310 may use a pre-learned model for motion recognition stored in the storage 104 or connected through the network interface 102.

For example, in a case when the user's motion, identified by the motion identifying module 310, satisfies a predetermined requirement, that is, in a case when a motion such as the user sitting down and then standing up is recognized as a squat motion, the exercise state information generating module 320 counts this as one squat motion.

For example, the inventory determining module 330 may determine contents to be provided to the user, such as a position and/or an area of a page or a space in which an advertisement is presented.

For example, the content matching module 340 may take various elements into consideration, such as personal information of the user, the exercise amount of the user, a target reward of the user, the exercise amount of a competitor, etc. and determine a content matching these elements of the user. For example, the content matching module 330 may determine an advertisement to be provided to the user, which matches the personal information of the user.

For example, the reward determining module 350 may determine a reward to be provided to the user. For example, such a reward may be determined based on achievement of the target amount of exercise, the degree of compliance with a tutor's exercise posture guide and/or the kind/length/inventory area of an advertisement that the user has watched.

Figure 4:
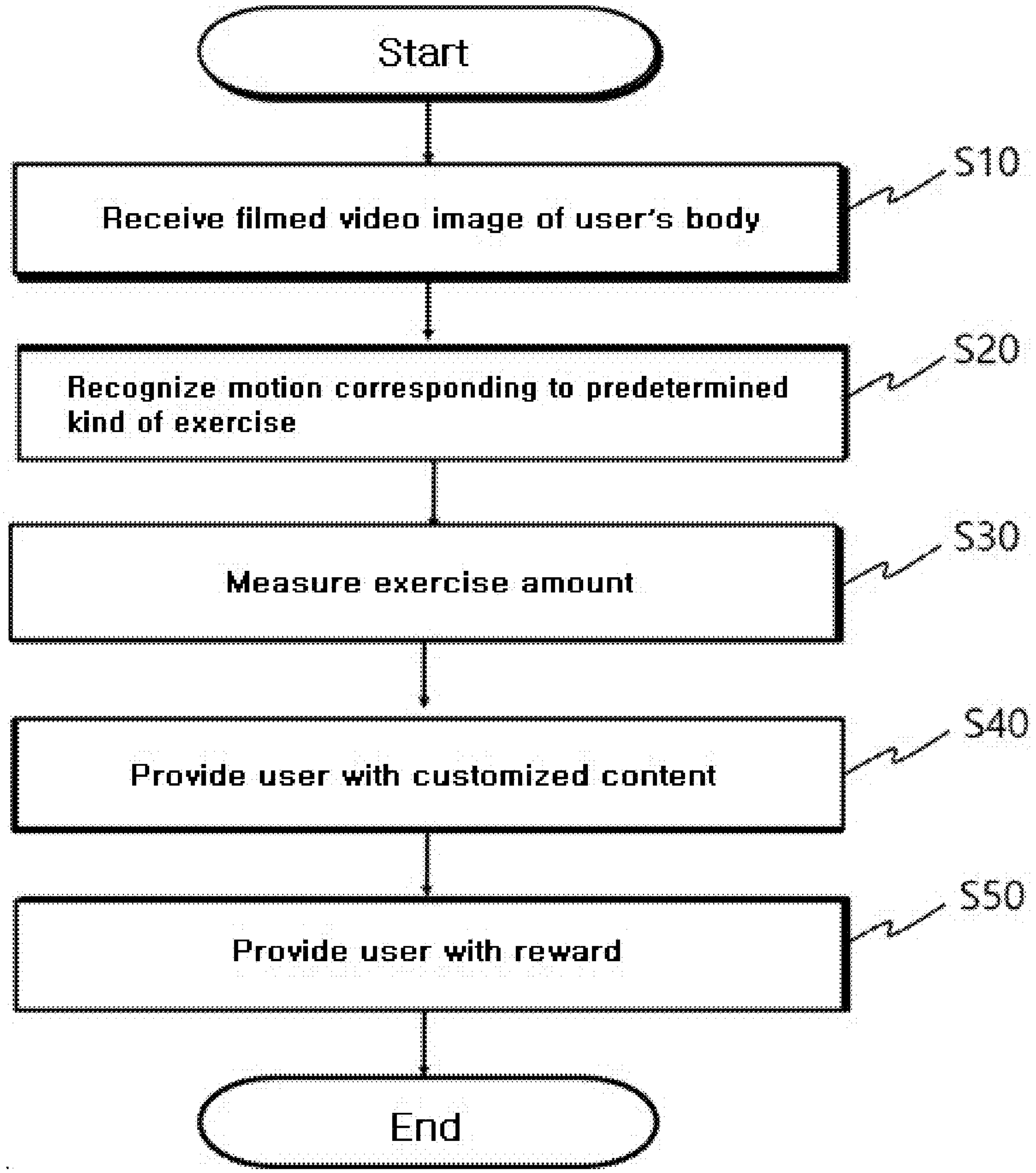
FIG. 4 is a flow diagram of a method for providing rewards based on exercise amount measurement according to still another embodiment of the present disclosure.

FIG. 4 is a flow diagram of a method for providing rewards based on exercise amount measurement according to still another embodiment of the present disclosure.

Each step of FIG. 4 is performed by the reward providing apparatus 100. Specifically, each step is performed when the processor 101 of the reward providing apparatus 100 performs operations regarding the respective modules of the software 105.

Referring to FIG. 4, the reward providing apparatus 100 may receive a video image of the user's body inputted through the image input part of the user terminal 200 (S10). For example, the user terminal 200 may comprise a camera as the image input part and the reward providing apparatus 100 may receive in real time the video image of the user's body filmed by the camera.

The reward providing apparatus 100 may recognize a motion corresponding to a predetermined kind of an exercise in the inputted video image of the user's body using a pre-learned artificial intelligence model for motion recognition (S20). According to an embodiment, in a case when the exercise is the squat and the user performs a motion of sitting down and subsequently standing up, the reward providing apparatus 100 may analyze such a motion of the user by using the pre-learned artificial intelligence model for motion recognition. When, as a result of the analysis, at least a part of the user's motion has a similarity value within a predetermined range to a squat motion, the reward providing apparatus 100 may recognize the user's motion as one squat motion.

For example, the identification of at least a part of a motion may be made based on a skeleton analysis using a pre-learned model for motion recognition. The reward providing apparatus 100 may extract feature points of joint areas of the user's body from the video image of the user's body and determine whether at least a part of a motion of the user matches a squat motion in time series by using at least part of information, such as the moving distance and direction of coordinates of the extracted feature points, the distance and/or angle between feature points.

The reward providing apparatus 100 may measure the amount of the exercise, such as the squats based on recognized motions (S30). For instance, the reward providing apparatus 100 may measure the number of repeated squat motions, the user's compliance with a predetermined number in one set of exercise motions, the accomplishment level of the user's target sets, the cumulative number of total sets of exercise, or the like. For another example, the reward providing apparatus 100 may measure the precision of a squat motion and apply it to the measurement of the exercise amount.

The reward providing apparatus 100 may provide the user with a customized content through a first area of the image output part based on the measured amount of exercise and at least one piece of the above described user's information (S40).

For example, the user's information may include at least one piece of personal information such as age, gender, residence, preference, SNS identification, weight, height, exercise target, cumulative number of squats, etc.

For example, the content may include an advertisement content and the type of contents may include an image advertisement, a banner advertisement, and a video image advertisement.

For example, the first area of the image output part may be determined in consideration of the eye level and sightline direction of the user who performs squat motions toward the image input part. That is, the reward providing apparatus 100, which recognizes the user's motions from the video image of the user's body, may estimate the user's sightline direction based on a plurality of feature points corresponding to the user's head and torso, distances and angles between the plurality of feature points, or the like, and determine the position of the first area based on the estimated sightline direction.

The reward providing apparatus 100 may provide the user with a reward based on the result of the user's watch of the provided content (S50). For example, if the user continuously performs squat motions and accumulates the duration of the user's watching advertisements, the user can watch one or more advertisements. In this case, the reward for the user may be determined based on at least one of the types, play time, and the number of advertisements. The play time of advertisements would be determined by the number and the duration of squats. Consequently, the exercise amount of the user may lead to a reward.

Figure 5:
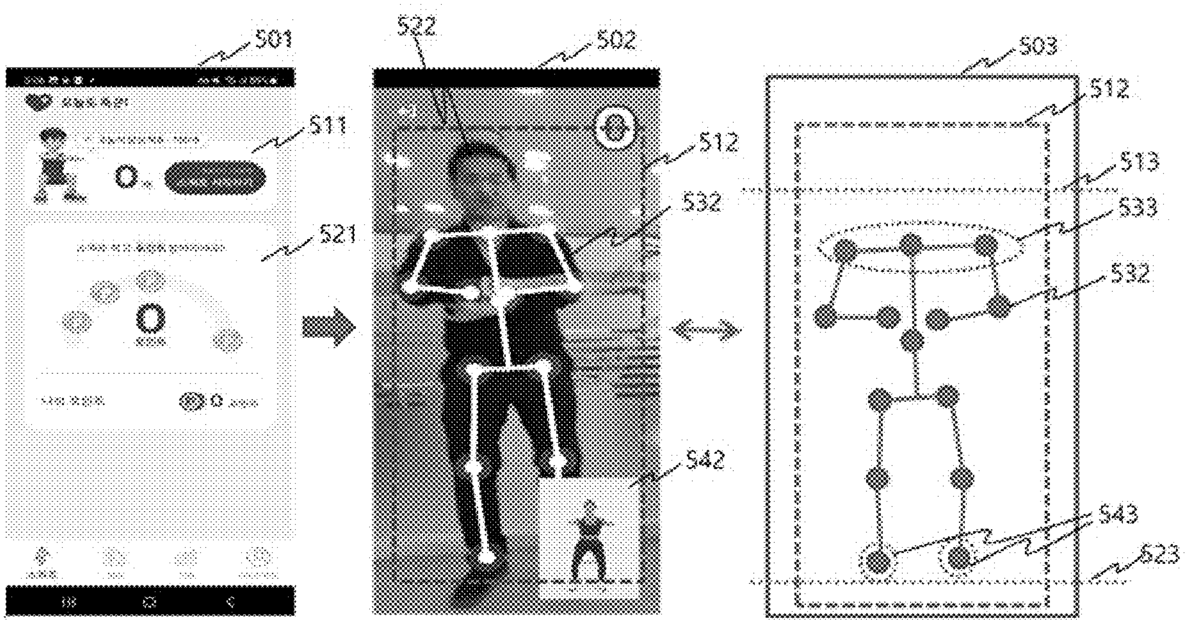
FIG. 5 and FIG. 6 are example diagrams for respectively illustrating a function of identifying a user's exercise posture and information of a user's exercise state to which some embodiments of the present disclosure refer.
Figure 6:
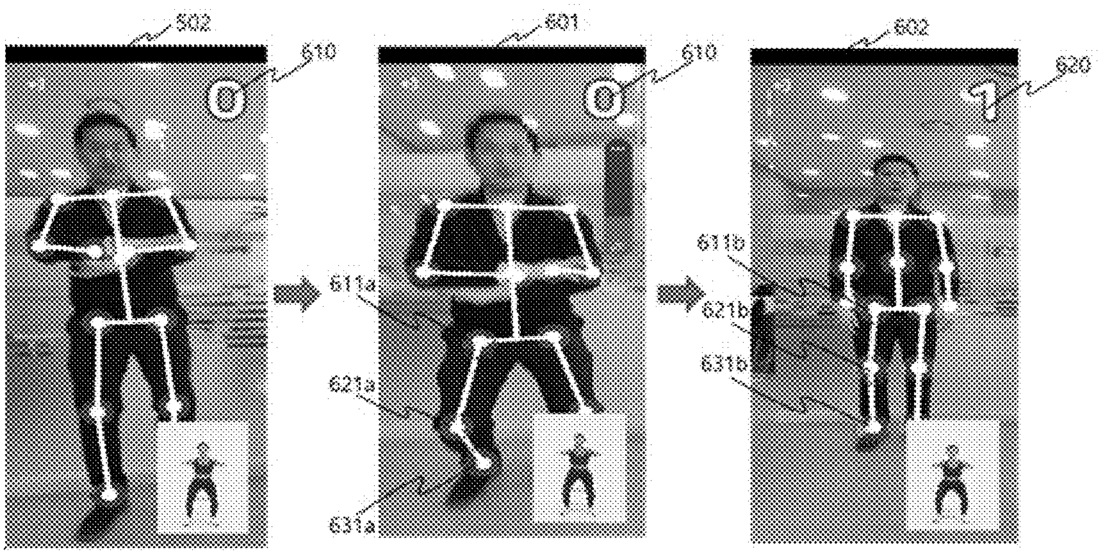

FIG. 5 and FIG. 6 are example diagrams for respectively illustrating a function of identifying a user's exercise posture and information of a user's exercise state to which some embodiments of the present disclosure refer.

Referring to FIG. 5, the reward providing apparatus 100 may provide screen information including various graphic user interfaces through the image output part of the user terminal 200.

The screen information 501 includes information such as the user's exercise target, cumulative rewards, or the like. When a request for a start of an exercise is inputted through the screen information 501, the reward providing apparatus 100 controls the user terminal 200 to start filming a video image of the user's body.

Screen information 502 includes a filmed video image 522 of the user's body and feature points 532 overlapping the user's body of the video image.

According to an embodiment, the reward providing apparatus 100 may set an exercise amount measurement area 512 in screen information 522 and, when it is determined that predetermined feature points are located in the exercise amount measurement area 512, the reward providing apparatus 100 may measure an exercise motion of the user by analyzing movements of the feature points. The exercise amount measurement area 512 may be indicated in the screen information 502 depending on settings of the user. However, embodiments of the present disclosure are not limited thereto. It may not be visually indicated depending on the user's settings.

Specifically, the reward providing apparatus 100 may extract feature points corresponding to the user's body of the video image using a motion recognition model and determine whether the feature points are located within a predetermined area of the screen of the image output part.

When the feature points are determined to be located within the predetermined area, the reward providing apparatus 100 may recognize movements of the feature points sensed within a predetermined pattern range as a motion corresponding to the exercise (the squats).

In another embodiment, in order to determine whether the feature points of screen information 503 are located in the exercise amount measurement area 512, the reward providing apparatus 100 may determine coordinates indicating locations of predetermined feature points in the screen. For the convenience of the description, the video image of the user's body is omitted in the screen information 503.

Referring to the screen information 503, the reward providing apparatus 100 may identify minimum groups of feature points 532 for the measurement of the exercise amount in the video image of the user's body. The reward providing apparatus 100 may identify a first group of feature points 533 and a second group of feature points 543, which are predetermined, among the groups of feature points 532. The first group of feature points 533 includes at least one feature point located in an uppermost end portion and the second group of feature points 543 includes at least one feature point located in a lowermost end portion.

The reward providing apparatus 100 may set an upper limit line of feature point measurement 513 at a predetermined distance from the feature point in the uppermost end portion and a lower limit line of feature point measurement 523 at a predetermined distance from the feature point in the lowermost end portion.

When the upper limit line of feature point measurement 513 and the lower limit line of feature point measurement 523 are located within the exercise amount measurement area 512, the reward providing apparatus 100 may start measuring the exercise amount. The reason for setting the upper limit line and the lower limit line is that, if an uppermost feature point or a lowermost feature point is out of the exercise amount measurement area due to the user's movement, it would be difficult to measure the exercise amount precisely. That is, in order to ensure that a feature point is not omitted from the exercise amount measurement, even if the feature point is out of its initial position while the user performs squats, the reward providing apparatus 100 may allow a measurement area to be set in advance.

Meanwhile, according to another embodiment, the screen information 502 may include a video image of a tutor 542 to guide the user through correct exercise motions. The reward providing apparatus 100 may determine whether movements of feature points corresponding to the user's body indicate squat motions based on motions of the video image of the tutor.

In still another embodiment, in order to determine whether feature points are located within a predetermined exercise amount measurement area, the reward providing apparatus 100 may generate movement guide information for feature points regarding an exercise (squats) based on at least one piece of information among distances and angles between extracted feature points. In this case, the reward providing apparatus 100 may determine whether a motion of the user corresponds to an exercise motion (a squat motion) by determining the degree of match between the movements of feature points sensed within a predetermined pattern range and the generated movement guide information.

Referring to FIG. 6, the screen information 502 may include exercise state information 610.

Referring to screen information 601, the reward providing apparatus 100 may sense the movement of at least one of feature points in a depth direction of the screen of the image output part so as to recognize a motion of the user as a motion corresponding to, for example, a squat. Here, a feature point 611*a* moves in the depth direction of the screen, that is, toward the back of the screen relative to a feature point 631*a*, and a feature point 621*a* moves toward the front of the screen relative to a feature point 631*a* to form an angle between two lines connecting the three feature points 611*a*, 621*a*, 631*a*.

The reward providing apparatus 100 may sense the movements of a plurality of feature points within a predetermined pattern range when at least one of such feature points moves. Accordingly, the reward providing apparatus 100 may recognize a motion corresponding to an exercise motion (for example, a squat motion) and count the number of squats by sensing the movements of the plurality of feature points within the predetermined pattern range.

The reward providing apparatus 100 outputs, as screen information 601, a video image of the user's body through the image output part and marks extracted feature points to overlap the user's body of the outputted video image.

In an embodiment, the reward providing apparatus 100 may provide the user with a customized content (not shown) through the first area of the image output part. Specifically, the reward providing apparatus 100 may provide the user with the content through the first area of the image output part with the extracted feature points marked to overlap the user's body of the video image.

Referring to screen information 602, coordinates of the feature points 611*a*, 621*a*, 631*a* of the screen information 601 are changed and these feature points with changed coordinates are indicated by 611*b*, 621*b*, 631*b* in the screen information 602.

By analyzing the video image of the user's body of the screen information 601 and the video image of the user's body of the screen information 602, the reward providing apparatus 100 may recognize the relevant movement of the user as one squat motion to measure the exercise amount and change the exercise state information 610 to exercise state information 620 in the screen information.

Figure 7:
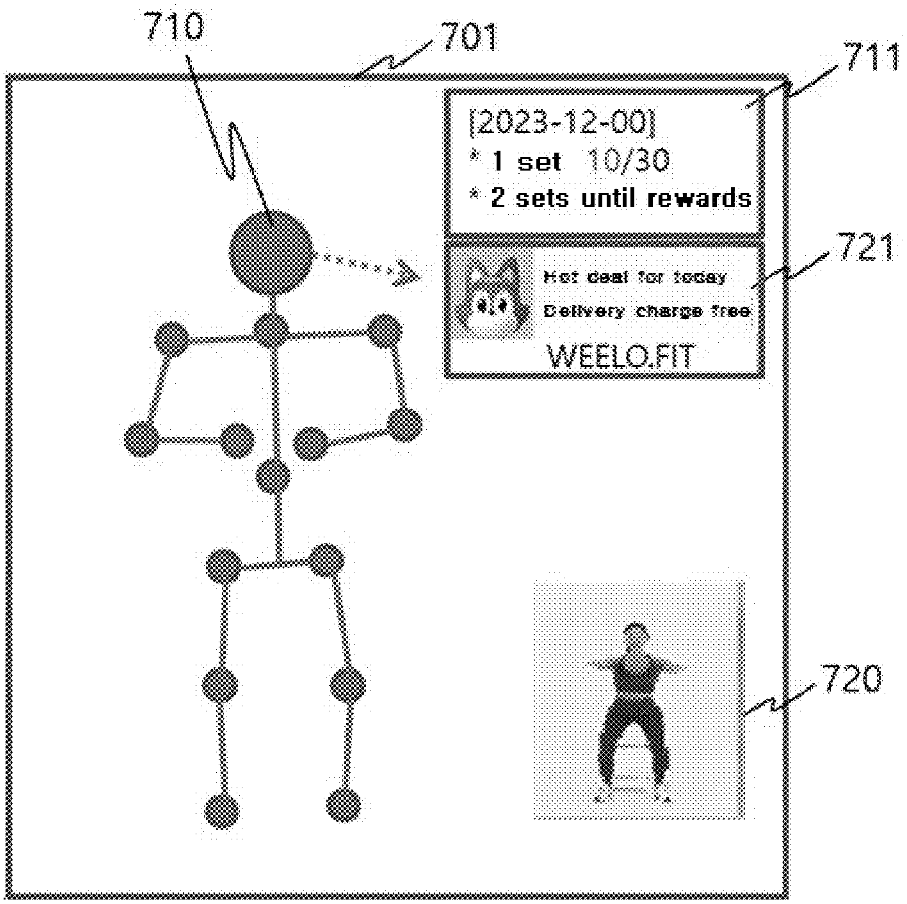
FIG. 7 is an example diagram for illustrating an inventory and a content for providing rewards, to which still another embodiment of the present disclosure refers.

FIG. 7 is an example diagram for illustrating an inventory and a content for providing rewards, to which still another embodiment of the present disclosure refers.

Referring to FIG. 7, the reward providing apparatus 100 may provide the user with a customized content. In an embodiment, the reward providing apparatus 100 may provide a first content based on the measured exercise amount and at least one piece of the user's information.

Referring to screen information 701 of FIG. 7, the user's body of the video image is represented by feature points 710 from a skeleton analysis and a content 721 is shown in an area of the image output part in addition to a video image of a tutor 720 and exercise state information 711.

For example, in a case when the measured exercise amount exceeds a predetermined number, the reward providing apparatus 100 may provide a second content different from the first content through the first area. For instance, the user performing squat motions may have a different concentration on the screen depending on the number of squats and, as the number of squats approaches a target number, such as 30, the user's concentration may become particularly high.

The reward providing apparatus 100 may display different advertisements based on the exercise amounts, taking into account the user's concentration, to maximize the effect of advertising exposure. That is, the reward providing apparatus 100 may change displayed advertisements in real time by reflecting the cumulative exercise amount of the user, the remaining number to the target exercise amount, or the like. This may allow an owner of a reward providing apparatus 100 to sell advertisements to the relevant advertisers at different prices.

For another example, the reward providing apparatus 100 may provide the user with advertisement contents in various sizes by reflecting the cumulative exercise amount of the user, the remaining number to the target exercise amount, or the like.

That is, when providing the second content through the first area, the reward providing apparatus 100 may provide the second content through a second area with an expanded size compared with the first area.

Figure 8:
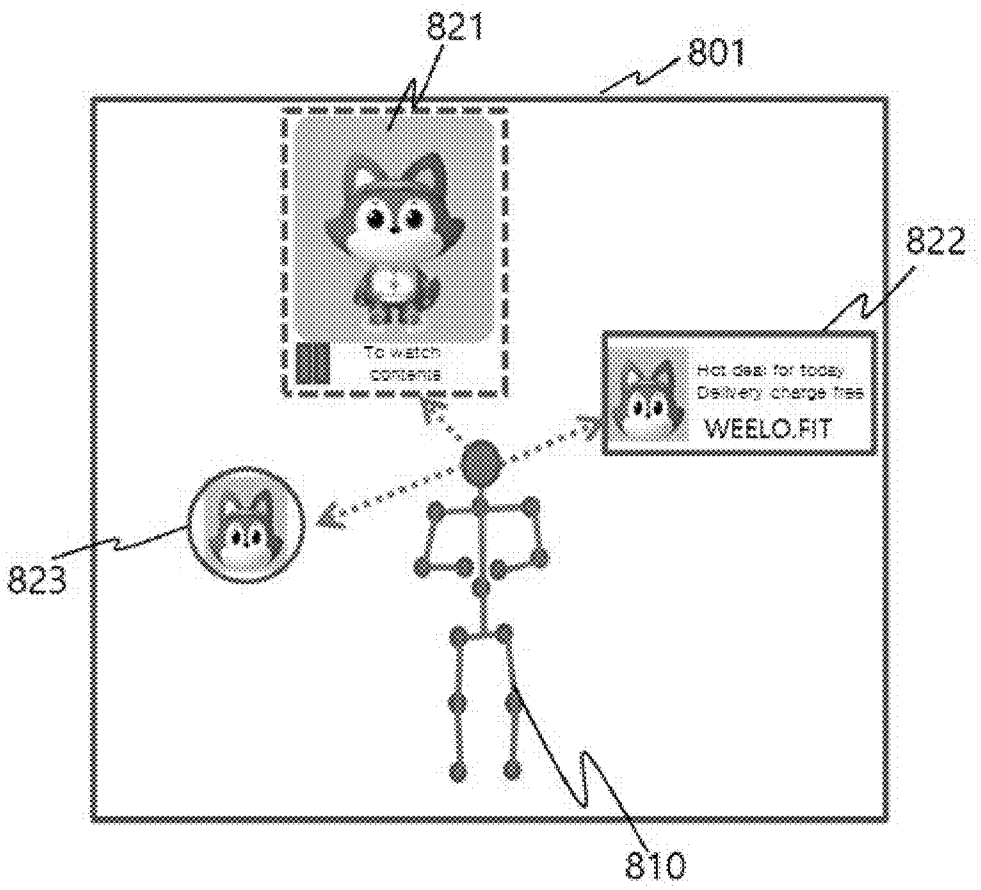
FIG. 8 is an example for illustrating an embodiment, to which some embodiments of the present disclosure refer, in which the size and position of an inventory, outputted for guiding a user's exercise posture, are changed.

FIG. 8 is an example for illustrating an embodiment, to which some embodiments of the present disclosure refer, in which the size and position of an inventory, outputted for guiding a user's exercise posture, are changed.

Referring to FIG. 8, the reward providing apparatus 100 may provide the user with at least one of customized contents 821, 822, 823 as shown in screen information 801.

For example, the reward providing apparatus 100 may determine the degree of match between the movements of feature points, corresponding to the user's body parts, detected within a predetermined pattern range and the generated movement guide information. That is, the reward providing apparatus 100 may determine the degree of match between a motion of the user and a reference motion which can be recognized as a squat motion.

When the degree of match falls short of a predetermined critical match degree value, the reward providing apparatus 100 may provide a content through the second area in a position different from that of the first area.

For example, as shown in the screen information 801, the reward providing apparatus 100 may change the position of a content from the position of the content 822 to the position of the content 821 or the position of the content 823.

When assessing movements of the user based on the movement guide information, if a movement of the user is not within the predetermined pattern range or the degree of match with the reference movement of the movement guide information is very low even though it is within the predetermined pattern range, the movement of the user may be classified as one requiring posture correction.

When changing the user's sightline for the posture correction, this naturally leads to improvement in the distance between two feet, the body direction, the sightline angle, the straightening of shoulders. Accordingly, the reward providing apparatus 100 may determine the position of a content by taking into account the degree of necessity for the user's posture correction.

While a content is being presented through the second area, the reward providing apparatus 100 may assess whether the degree of match, between movements of feature points and the reference movements in the generated movement guide information, exceeds the predetermined critical match degree value.

Based on the result of the assessment, the reward providing apparatus 100 may determine the final position for presenting the content.

For example, when the degree of match is higher than the predetermined critical match degree value, the reward providing apparatus 100 may fix the position of the content and, when the degree of match is lower than the predetermined critical match degree value, the reward providing apparatus 100 may change again the position of the content.

Figure 9:
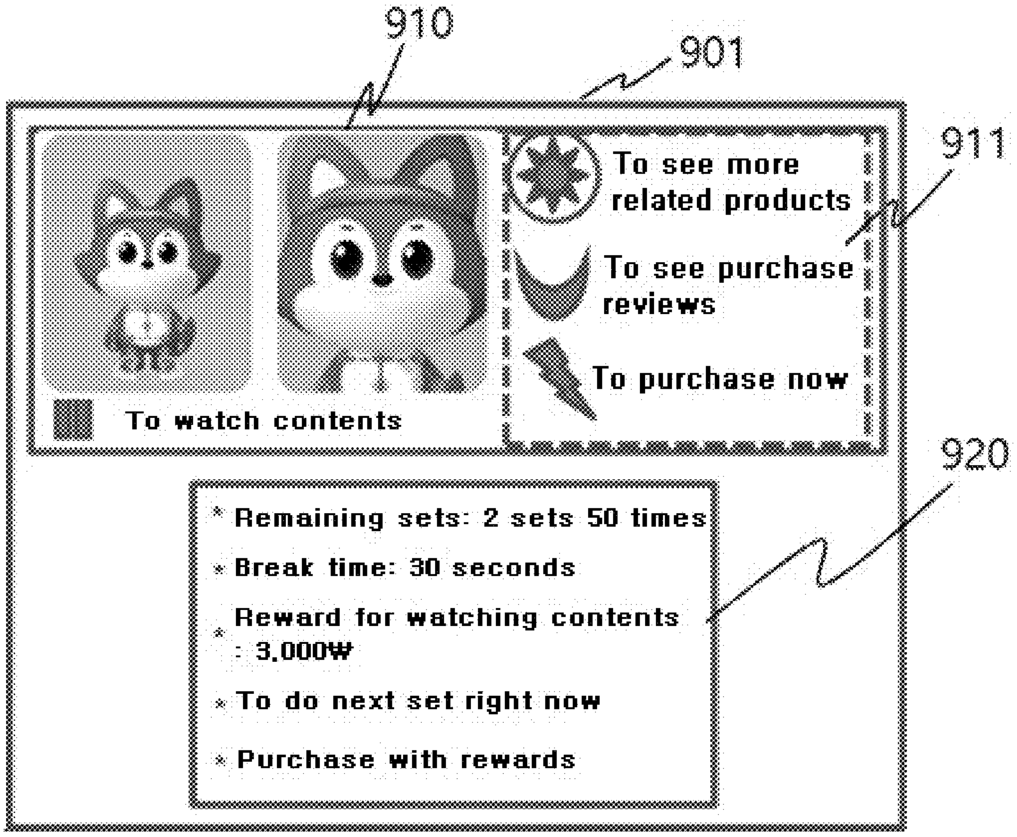
FIG. 9 is an example for illustrating an inventory and a content outputted during a break of an exercise or after completing an exercise corresponding to a user's achievement in the exercise, to which still another embodiment of the present disclosure refers.

FIG. 9 is an example for illustrating an inventory and a content outputted during a break or after having finished an exercise corresponding to a user's achievement in the exercise, to which still another embodiment of the present disclosure refers.

Referring to FIG. 9, before starting a next set after completing some of a target number of sets or after finishing the exercise, the reward providing apparatus 100 may display screen information 901 on the user terminal 200.

The screen information 901 may include an inventory 910, which is an area where contents are presented, an interface 911 for purchasing products related to contents, and exercise state information 920.

In an embodiment, the reward providing apparatus 100 may determine the size of the area for displaying contents based on a measured exercise amount and at least one piece of the user's information.

The reward providing apparatus 100 may generate an inventory through the image output part based on the determined size and determine the kind and/or duration of a content to be presented in the inventory based on the measured exercise amount and at least one piece of the user's information.

After determining the kind and/or duration of a content, the reward providing apparatus 100 may present the content in the inventory. FIG. 9 shows an example in which a video content with a predetermined duration is presented.

Figure 10:
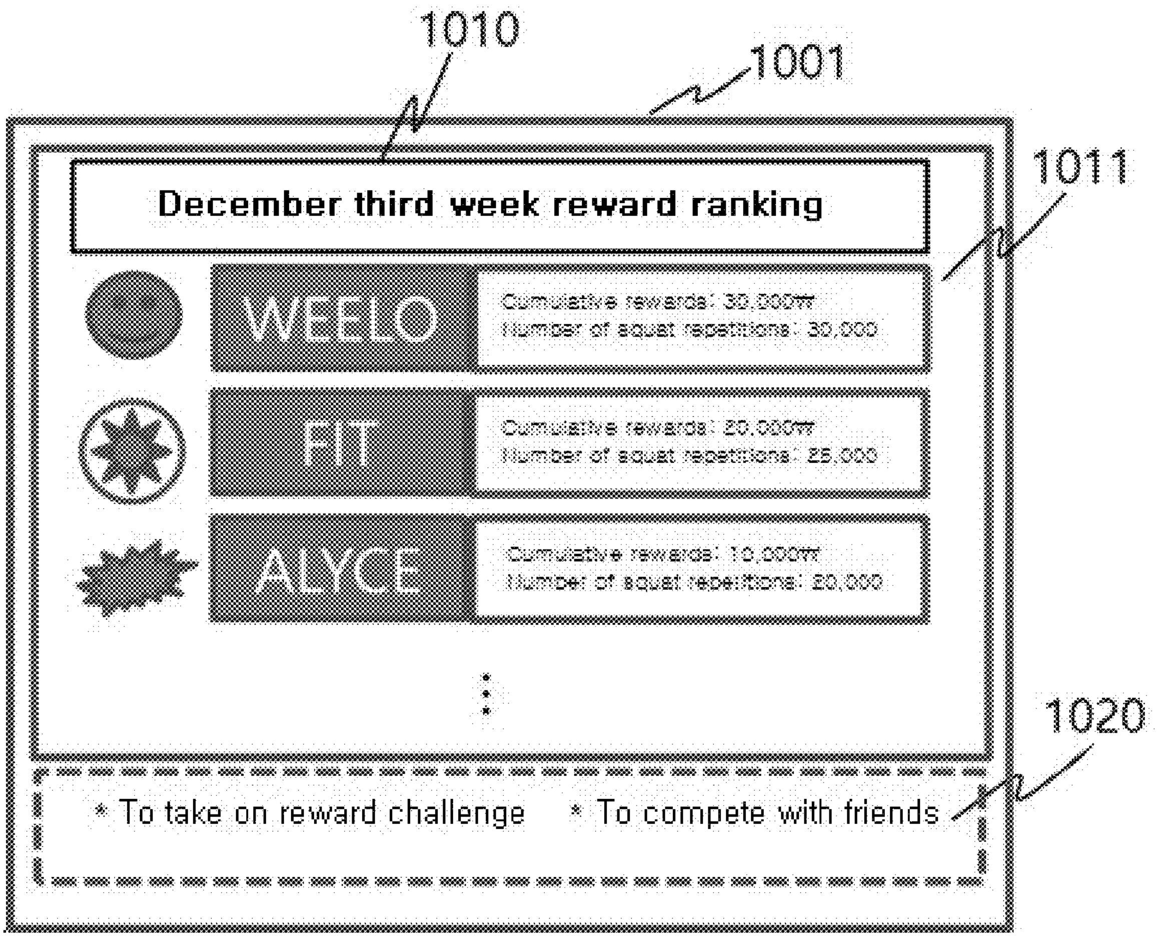
FIG. 10 is an example for illustrating a function of providing a reward ranking, to which some embodiments of the present disclosure refer.

FIG. 10 is an example for illustrating a function of providing a reward ranking, to which some embodiments of the present disclosure refer.

Referring to FIG. 10, the reward providing apparatus 100 may provide reward acquisition ranking information 1010 based on an exercise amount of the user as shown in screen information 1001. The reward providing apparatus 100 may provide information 1011 of a user of each rank and an exercise competition menu 1020.

According to an embodiment, when determining the size of a content to be presented, the reward providing apparatus 100 may compare a measured exercise amount of a competitor pre-set through the user terminal 200 and a measured exercise amount of the user and use the comparison result as a basis of the size determination.

For example, a competition function between users, networked as exercise competitors, exercise friends, or the like through an SNS or an application according to an embodiment of the present disclosure, may be provided, and a winner among the user and competitors may be determined based on cumulative exercise amounts or whether a squat target is achieved.

The reward providing apparatus 100 may operate a competition mode in which a greater reward is assigned to a winner by presenting a bigger size of an advertisement to the winner.

The methods of decisions and/or operations of processors according to the embodiments of the present disclosure described referring to the drawings may be executed by the computer program implemented by computer-readable codes. The computer program may be transmitted from a first computing apparatus to a second computing apparatus through a network such as an internet, installed in the second computing apparatus, and used in the second computing apparatus. The first computing apparatus and the second computing apparatus may comprise both stationary computing apparatuses, such as server apparatuses, desktop personal computers, and mobile computing apparatuses, such as notebook computers, smart phones, tablet personal computers.

Although the embodiments of the present disclosure are described with reference to the drawings, a person with ordinary skill in the art, to which the present disclosure pertains, would understand that the present disclosure can be implemented in other specific ways without changing its technological concept or essential characteristics. Therefore, it should be understood that the embodiments described above are provided for illustrative purpose, not limitative purpose.

LIST OF REFERENCE NUMBERS

10: Reward providing system
50: User
100: Reward providing apparatus
101: Processor
102: Network interface
103: Memory
104: Storage
105: Reward providing software (S/W)

106: Reward data
200: User terminal
210: Screen

What is claimed is:

1. A method for providing rewards based on exercise amount measurement performed by a reward providing apparatus, the method comprising:

receiving a video image of a user's body inputted through an image input part of a user terminal;

extracting feature points corresponding to the user's body in the video image using a pre-learned artificial intelligence model for motion recognition;

automatically displaying, in a screen of an image output part of the user terminal, the received video image of the user's body and the extracted feature points overlapping the user's body of the received video image, in real time;

automatically displaying, in the screen of the image output part of the user terminal, an exercise target, an exercise state information, a cumulative reward and a start icon in a graphical user interface (GUI);

recognizing a motion corresponding to a pre-set exercise in the video image of the user's body using the pre-learned artificial intelligence model for motion recognition, wherein the recognizing the motion corresponding to the pre-set exercise in the video image of the user's body using the pre-learned artificial intelligence model for motion recognition comprises:

determining whether the feature points are within a predetermined area in the screen of the image output part; and recognizing movements of the feature points sensed within a predetermined pattern range as a motion corresponding to the exercise when the feature points are determined to be within the predetermined area, measuring an exercise amount based on the recognized motion;

automatically displaying a customized content to the user through a first area of the screen of the image output part based on the measured exercise amount and at least one piece of the user's information; and automatically displaying a reward to the user based on a watch result of the provided content.

2. The method of claim 1, wherein recognizing the motion corresponding to the pre-set exercise further comprises:

sensing a movement of at least one of the feature points in a depth direction of the screen of the image output part; and recognizing a motion corresponding to the exercise by sensing movements of a plurality of feature points within the predetermined pattern range when the at least one of the feature points moves, and measuring an amount of the exercise comprises counting the number of exercise motions when sensing that the plurality of feature points move within the predetermined pattern range.

3. The method of claim 1, wherein determining whether the feature points are within the predetermined area comprises generating movement guide information of the feature points regarding the exercise based on at least one piece of information among distances and angles between extracted feature points, and recognizing a motion corresponding to a pre-set exercise comprises determining the degree of match between the movements of the feature points sensed within the predetermined pattern range and the movement guide information.

4. The method of claim 1, wherein automatically displaying the customized content to the user through the first area of the image output part comprises automatically displaying the customized content through a second area in a position different from that of the first area when the degree of match falls short of a predetermined critical match degree value.

5. The method of claim 4, wherein automatically displaying the customized content through the second area of the image output part comprises:

assessing whether the degree of match, between movements of the feature points and movements in the movement guide information, exceeds the predetermined critical match degree value; and determining a final position for providing the content based on a result of the assessment.

6. The method of claim 1, wherein automatically displaying the customized content to the user comprises:

automatically displaying a first content based on the measured exercise amount and at least one piece of the user's information; and automatically displaying a second content different from the first content through the first area in a case when a measured exercise amount exceeds a predetermined number.

7. The method of claim 6, wherein automatically displaying the second content through the first area comprises automatically displaying the second content through the second area with an expanded size compared with the first area.

8. The method of claim 1, wherein automatically displaying the customized content to the user comprises:

determining the size of an area for outputting contents based on a measured exercise amount and at least one piece of the user's information;

generating an inventory through the image output part based on the determined size;

determining at least one of the kind and duration of a content to be outputted in the inventory based on the measured exercise amount and at least one piece of the user's information; and automatically displaying the content, of which the at least one of the kind and duration is determined, through the generated inventory.

9. The method of claim 8, wherein determining the size of the area for outputting contents based on the measured exercise amount and at least one piece of the user's information comprises:

comparing a measured exercise amount of a competitor pre-set through the user terminal and a measured exercise amount of the user, and determining the size of a content to be outputted based on the comparison result.

10. A reward providing apparatus comprising:

at least one processor;

a network interface to receive a video image of a user's body filmed by a user terminal;

a memory to load a computer program executed by the processor; and a storage in which the computer program is stored, wherein the computer program comprises:

an operation of receiving the video image of the user's body inputted through an image input part of a user terminal;

an operation of extracting feature points corresponding to the user's body in the video image using a pre-learned artificial intelligence model for motion recognition;

an operation of automatically displaying, in a screen of an image output part of the user terminal, the received video image of the user's body and the extracted feature points overlapping the user's body of the received video image, in real time;

an operation of automatically displaying, in the screen of the image output part of the user terminal, an exercise target, an exercise state information, a cumulative reward and a start icon in a graphical user interface (GUI);

an operation of recognizing a motion corresponding to a pre-set exercise in the video image of the user's body using the pre-learned artificial intelligence model for motion recognition;

wherein the operation of recognizing the motion corresponding to the pre-set exercise in the video image of the user's body using the pre-learned artificial intelligence model for motion recognition comprises:

an operation of determining whether the feature points are within a predetermined area in the screen of the image output part; and an operation of recognizing movements of the feature points sensed within a predetermined pattern range as a motion corresponding to the exercise when the feature points are determined to be within the predetermined area, an operation of measuring an exercise amount based on the recognized motion;

an operation of automatically displaying a customized content to the user through a first area of the screen of the image output part based on the measured exercise amount and at least one piece of the user's information; and an operation of automatically displaying a reward to the user based on a watch result of the provided content.

* * * * *